J. K. WEDGWORTH.
NUT LOCK.
APPLICATION FILED NOV. 22, 1909.
972,960.
Patented Oct. 18, 1910.
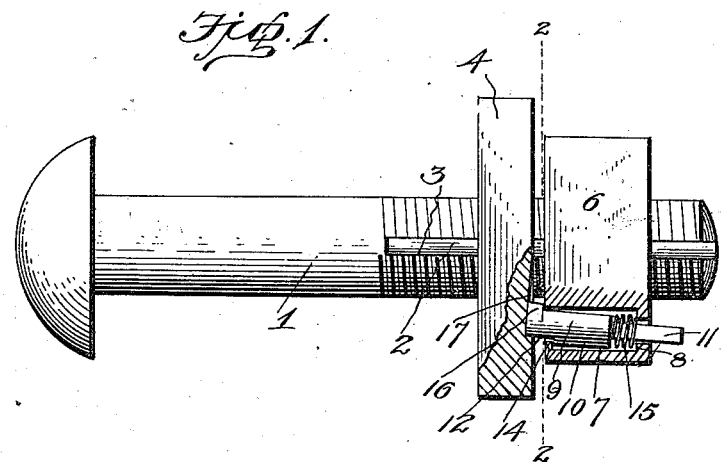
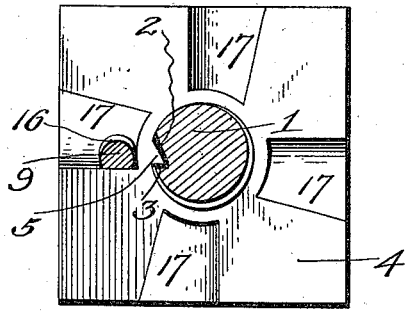
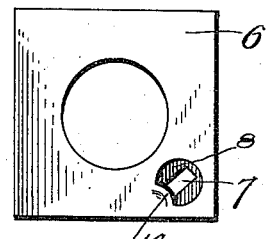
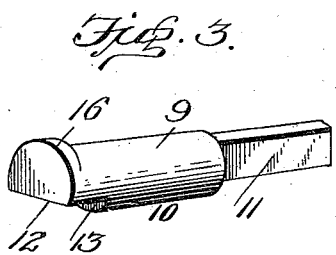
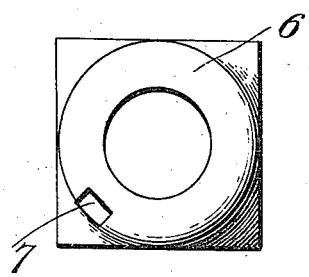
Witnesses
C. E. Hunt
C. H. Griesbauer
Inventor
J. K. Wedgworth
by H. B. Wilson & Co.
Attorneys
THE NORRIS PETERS CO., WASHINGTON, D. C.

UNITED STATES PATENT OFFICE.

JOHN K. WEDGWORTH, OF CUBA, ALABAMA.

NUT-LOCK.

972,960.  Specification of Letters Patent.  Patented Oct. 18, 1910.

Application filed November 22, 1909. Serial No. 529,401.

*To all whom it may concern*

Be it known that I, JOHN K. WEDGWORTH, a citizen of the United States, residing at Cuba, in the county of Sumter and State of Alabama, have invented certain new and useful Improvements in Nut-Locks; and I do declare the following to be a full, clear, and exact description of the invention, such as will enable others skilled in the art to which it appertains to make and use the same.

This invention relates to improvements in nut locks.

The object of the invention is to provide a nut lock having an improved construction and arrangement of locking mechanism and means to hold the latter in operative position thus preventing the unscrewing of the nut from the bolt.

With the foregoing and other objects in view, the invention consists of certain novel features of construction, combination and arrangement of parts, as will be more fully described and particularly pointed out in the appended claims.

In the accompanying drawings, Figure 1 is a side view partly in section of a nut lock constructed in accordance with my invention; Fig. 2 is a cross section on the line 2—2 of Fig. 1 looking toward the washer plate; Fig. 3 is a detail view of the locking pin; Fig. 4 is an end view of the inner end of the nut; and Fig. 5 is a similar view of the outer end.

Referring more particularly to the drawings, 1 denotes a bolt in one side of the threaded portion of which is formed a longitudinally disposed groove 2 having an abrupt side wall or square shoulder 3. On the bolt 1 is arranged a washer plate 4, this washer plate having a passage of sufficient size to fit loosely over the bolt and in one side of the passage in the washer plate is formed a substantially V-shaped lug 5. The lug 5 is beveled on one side and provided with an abrupt wall or square shoulder on its opposite side as shown. When the washer plate 4 is in position on the bolt, the lug 5 slidably engages the groove 2 in the bolt and when so engaged the square shoulder on the lug engages the square shoulder or wall 3 of the groove and thus prevents the washer turning on the bolt.

On the bolt 1 is screwed a nut 6 in one corner of which is formed a longitudinal passage or bore 7. The outer portion of the passage 7 is preferably of rectangular shape while the inner portion is substantially cylindrical and is of greater diameter than the outer portion of the passage thus forming a shoulder 8, the purpose of which will hereinafter appear. Slidably mounted in the passage 7 is a lock-pin 9, said pin having an enlarged cylindrical inner portion 10 and a reduced rectangular outer portion 11. The rectangular outer portion of the locking pin engages the rectangular portion of the passage in the nut while the cylindrical inner portion of the pin engages the cylindrical portion of the passage. In one side of the pin 9 adjacent to its inner end is formed a recess 12 which provides a shoulder 13. After the pin has been inserted in the passage in the nut, the edge of the material forming the wall of the passage at the inner side or end of the nut and opposite to the recessed portion of the pin is upset or struck in to form a retaining bur 14, which projects into the passage 7 and forms a stop which is adapted to be engaged by the shoulder 13 at the inner end of the recessed portion of the locking pin thereby preventing said pin from dropping entirely out of the passage in the bolt.

The locking pin 9 is preferably provided with a coiled projecting spring 15, which is arranged on the reduced portion of the pin between the shoulder 8 of the passage 7 and the inner end of the enlarged portion of the pin as shown. While I preferably employ a spring for automatically forcing the locking pin beyond the inner end of the nut, it is obvious that the spring may be dispensed with and the locking pin grasped by its outer end and manipulated by hand. On the inner end of the locking pin and preferably opposite to the recessed portion of said end is formed a laterally projecting stop lug 16, which when the projecting inner end of the pin is pushed or forced laterally to a slight extent in the direction of said lug, the latter will be engaged with the inner side or end of the nut and will thus prevent the locking pin from being forced inwardly. It will thus be seen that the lug 16 prevents the locking pin from being casually retracted and positively holds said pin in position to lock the nut as will be hereinafter described.

The inner end of the locking pin 9 is preferably beveled in one direction as shown and said beveled end is adapted to be brought into engagement with beveled or ratchet shaped notches 17 formed in the inner side of the washer plate or fish plate, or other surface against which the nut is to be screwed. When the nut is screwed inwardly on the bolt, the beveled inner end of the locking pin will slide over the adjacent surface of the washer plate or fish plate and when said end comes opposite to the notches 17 in said plate, the spring when used, will force the pin inwardly into the notches. When the pin is thus engaged with the notches any retrograde or unscrewing movement of the nut will bring the square surface of the recessed portion 12 of the locking pin into engagement with the square shoulder of the notch thus preventing the unscrewing of the nut. When the inner end of the locking pin is thus engaged with the nut any tendency of the nut to unscrew would press the end of the locking pin against the square wall of the nut, thus tilting or moving the end of the locking pin laterally to a slight extent, thus bringing the stop lug 16 on the outer end of the pin over or into engagement with the inner end of the nut, thus positively preventing the retraction of the locking pin, thus holding the nut in place on the bolt.

When it is desired to unscrew the nut from the bolt, the nut must first be turned to a slight extent in the direction for screwing the nut on the bolt, which movement of the nut will bring the beveled outer end of the pin into engagement with the inclined wall of the notch 17, which engagement will have a tendency to tilt or push the inner end of the locking pin back, thus disengaging the stop lug 16 on the end of the pin from the adjacent end or surface of the nut, thereby permitting the pin to be retracted by grasping the outer end of the pin with the fingers or a suitable implement thus permitting the nut to be unscrewed from the bolt.

While I have herein shown and described the use of a washer plate 4 in which are formed the ratchet notches 17 to receive the inner end of the locking pin, it is obvious that when the bolts are used in connection with new fish plates or other surfaces in which the ratchet notches may be formed, said washer plates may be dispensed with as may also the longitudinal grooving of the bolt.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a nut lock, a bolt, a nut adapted to be screwed thereon, a spring projected locking pin arranged in said nut, a nut engaging surface having formed therein a series of ratchet notches adapted to receive the projecting inner end of the locking pin, means to prevent the pin from dropping out of the nut and a stop lug formed on the inner projecting end of the locking pin and adapted to be engaged with the inner end of the nut to hold said pin in a projected position.

2. In a nut lock, a bolt, having formed therein a longitudinal groove, a nut adapted to be screwed on said bolt, a washer plate arranged on the bolt and having formed in its outer side a series of ratchet notches, a beveled lug arranged in said washer plate and adapted to engage the groove in said bolt whereby the washer plate is held against turning on the bolt, a spring projected locking pin arranged in said nut, said pin having a beveled inner end adapted to be engaged with the beveled notches in said washer plate, a laterally projecting stop lug formed on one side of the inner end of said locking pin, said lug being adapted to be brought into engagement with the inner end of the bolt when the inner end of said locking pin is brought into engagement with the square surface of said ratchet notches thereby holding said locking pin in projected position and the nut lock on the bolt.

In testimony whereof I have hereunto set my hand in presence of two subscribing witnesses.

JOHN K. WEDGWORTH.

Witnesses:
A. J. McElroy,
J. M. McElroy.